US011986091B2

(12) United States Patent
Nuss

(10) Patent No.: US 11,986,091 B2
(45) Date of Patent: May 21, 2024

(54) POWERED TILT DRAWER FRONT FOR A DOMESTIC APPLIANCE

(71) Applicant: Haier US Appliance Solutions, Inc., Wilmington, DE (US)

(72) Inventor: Bart Andrew Nuss, Fisherville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 17/879,216

(22) Filed: Aug. 2, 2022

(65) Prior Publication Data

US 2024/0041208 A1 Feb. 8, 2024

(51) Int. Cl.

| | |
|---|---|
| ***A47B 88/00*** | (2017.01) |
| ***A47B 88/457*** | (2017.01) |
| ***A47B 88/90*** | (2017.01) |
| ***A47B 88/956*** | (2017.01) |
| ***E05B 65/46*** | (2017.01) |
| ***F25D 23/02*** | (2006.01) |
| ***F25D 25/02*** | (2006.01) |

(52) U.S. Cl.

CPC .......... *A47B 88/956* (2017.01); *A47B 88/457* (2017.01); *A47B 88/941* (2017.01); *E05B 65/46* (2013.01); *F25D 25/025* (2013.01); *A47B 2210/175* (2013.01)

(58) Field of Classification Search

CPC ...... F25D 25/025; F25D 23/021; F25D 23/02; F25D 23/028; F25D 2325/021; A47B 88/96; A47B 88/956; A47B 88/951; A47B 88/947; A47B 88/453; A47B 88/457; A47B 2210/175; E05B 65/46; E05Y 2900/31

See application file for complete search history.

(56) References Cited

U.S. PATENT DOCUMENTS

| | | | |
|---|---|---|---|
| 2,116,370 | A | 5/1938 | Watkins |
| 2,132,737 | A | 10/1938 | Kahn |
| 3,033,637 | A | 5/1962 | Donk et al. |
| 4,149,518 | A | 4/1979 | Schmidt et al. |
| 4,654,930 | A | 4/1987 | Lautenschlager, Jr. et al. |
| 5,947,573 | A | 9/1999 | Tovar et al. |
| 6,243,918 | B1 | 6/2001 | Zetti |
| 7,467,834 | B2 | 12/2008 | Kim et al. |
| 7,591,516 | B2 | 9/2009 | Kim et al. |
| 7,731,314 | B2 | 6/2010 | Kim |
| 7,815,268 | B2 | 10/2010 | Lee et al. |

(Continued)

FOREIGN PATENT DOCUMENTS

| | | | |
|---|---|---|---|
| CN | 1530604 | A * | 9/2004 |
| CN | 105972924 | A | 9/2016 |

(Continued)

*Primary Examiner* — Kimberley S Wright

(74) *Attorney, Agent, or Firm* — Dority & Manning, P.A.

(57) ABSTRACT

A drawer assembly for an appliance includes a drawer front for providing selective access to the drawer recess, the drawer front being rotatable between an open position and a closed position, a slide operably coupling the drawer front to the cabinet, the slide including a catch bar, an electronic input provided on the drawer front, the electronic input configured to transmit an input signal, and a latch provided in the drawer front, the latch being operably coupled with the electronic input and selectively engaged with the catch bar based on the input signal.

16 Claims, 7 Drawing Sheets

(56) References Cited

U.S. PATENT DOCUMENTS

| | | | | |
|---|---|---|---|---|
| 7,886,407 | B2 | 2/2011 | Resnik et al. | |
| 7,987,558 | B2 | 8/2011 | Beckmann et al. | |
| 8,186,781 | B2 | 5/2012 | Coleman et al. | |
| 8,231,190 | B2 | 7/2012 | Ertz et al. | |
| 8,459,759 | B2 | 6/2013 | Kang et al. | |
| 8,523,301 | B1 | 9/2013 | Britson | |
| 8,955,352 | B2 | 2/2015 | Lee et al. | |
| 9,635,771 | B2 | 4/2017 | Head | |
| 9,752,817 | B2 | 9/2017 | Richards et al. | |
| 10,119,219 | B2 | 11/2018 | Lee et al. | |
| 10,281,194 | B2 | 5/2019 | Choo et al. | |
| 10,362,870 | B1 | 7/2019 | Smith | |
| 10,443,271 | B1 | 10/2019 | Rose et al. | |
| 10,578,351 | B1 | 3/2020 | Nuss | |
| 10,712,082 | B1 * | 7/2020 | Nuss | E05D 11/1007 |
| 10,731,917 | B1 * | 8/2020 | Nuss | F25D 23/028 |
| 11,248,835 | B1 * | 2/2022 | Nuss | F25D 27/005 |
| 11,317,717 | B1 * | 5/2022 | Nuss | A47B 88/40 |
| 2004/0100168 | A1 | 5/2004 | Choi | |
| 2004/0183415 | A1 | 9/2004 | Kim | |
| 2005/0127804 | A1 | 6/2005 | Kim et al. | |
| 2006/0049731 | A1 | 3/2006 | Choi et al. | |
| 2006/0213852 | A1 * | 9/2006 | Kwon | F25D 25/021 211/151 |
| 2007/0035222 | A1 | 2/2007 | Lee et al. | |
| 2007/0126325 | A1 | 6/2007 | Gorz et al. | |
| 2009/0193836 | A1 | 8/2009 | Ertz et al. | |
| 2010/0090575 | A1 * | 4/2010 | Uthuppan | F25D 23/04 312/404 |
| 2016/0209102 | A1 | 7/2016 | Chowdary et al. | |
| 2018/0014638 | A1 | 1/2018 | Hanley et al. | |
| 2018/0223582 | A1 | 8/2018 | Shin et al. | |
| 2022/0133037 | A1 * | 5/2022 | Nuss | E05B 65/46 312/402 |

FOREIGN PATENT DOCUMENTS

| | | | |
|---|---|---|---|
| CN | 107763954 | A | 3/2018 |
| CN | 108868422 | A | 11/2018 |
| EP | 2754982 | A1 | 7/2014 |
| JP | H051990 | U | 1/1993 |
| JP | 2004191039 | A | 7/2004 |
| JP | 2004323043 | A | 11/2004 |
| JP | 2017020718 | A | 1/2017 |
| JP | 2017101891 | A | 6/2017 |
| KR | 1020050057863 | A | 6/2005 |
| WO | WO2011121834 | A1 | 10/2011 |
| WO | WO2018075094 | A1 | 4/2018 |

* cited by examiner

POWERED TILT DRAWER FRONT FOR A DOMESTIC APPLIANCE

FIELD OF THE INVENTION

The present subject matter relates generally to domestic appliances, and more particularly to drawer front panels for domestic appliances.

BACKGROUND OF THE INVENTION

Various types of consumer appliances are designed with pull-out compartment drawers. For example, a number of popular refrigerator styles have freezer compartments with one or more pull-out drawers that span the width of the appliance and include storage baskets or bins. Moreover, a number of popular refrigerators have an additional drawer having a shallower depth and typically provided above the freezer compartment. The conventional pull-out drawers typically include side brackets that are mounted to slides of a slide mechanism that, in turn, has a base member mounted to the compartment liner.

Some of the shallow-depth drawers may include a front portion that is able to tilt, e.g., in a forward direction, allowing a user to remove items without having to open the drawer to its maximum withdrawal distance. However, problems exist in that when the front portion is tilted downward and the drawer is retracted inward, damage may occur to the front portion and/or the freezer door located beneath the shallow-depth drawer. Moreover, physical operation of a tilt mechanism of such a front portion may be difficult or tedious.

Accordingly, a drawer assembly that obviates one or more of the above-mentioned drawbacks would be beneficial. In particular, a drawer assembly having automated features for controlling an opening of a drawer front would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a drawer assembly for an appliance is provided. The appliance may include a cabinet defining a drawer recess. The drawer assembly may include a drawer front for providing selective access to the drawer recess, the drawer front being rotatable between an open position and a closed position; a slide operably coupling the drawer front to the cabinet, the slide including a catch bar; an electronic input provided on the drawer front, the electronic input configured to transmit an input signal; and a latch provided in the drawer front, the latch being operably coupled with the electronic input and selectively engaged with the catch bar based on the input signal.

In another exemplary aspect of the present disclosure, a refrigerator appliance is provided. The refrigerator appliance may include a cabinet defining a fresh food storage chamber and a frozen food storage chamber; and a drawer slidably mounted within one of the fresh food storage chamber and the frozen food storage chamber and defining a drawer recess. The drawer may include a drawer front for providing selective access to the drawer recess, the drawer front being rotatable between an open position and a closed position; a slide operably coupling the drawer front to the cabinet, the slide including a catch bar; an electronic input provided on the drawer front, the electronic input configured to transmit an input signal; and a latch provided in the drawer front, the latch being operably coupled with the electronic input and selectively engaged with the catch bar based on the input signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
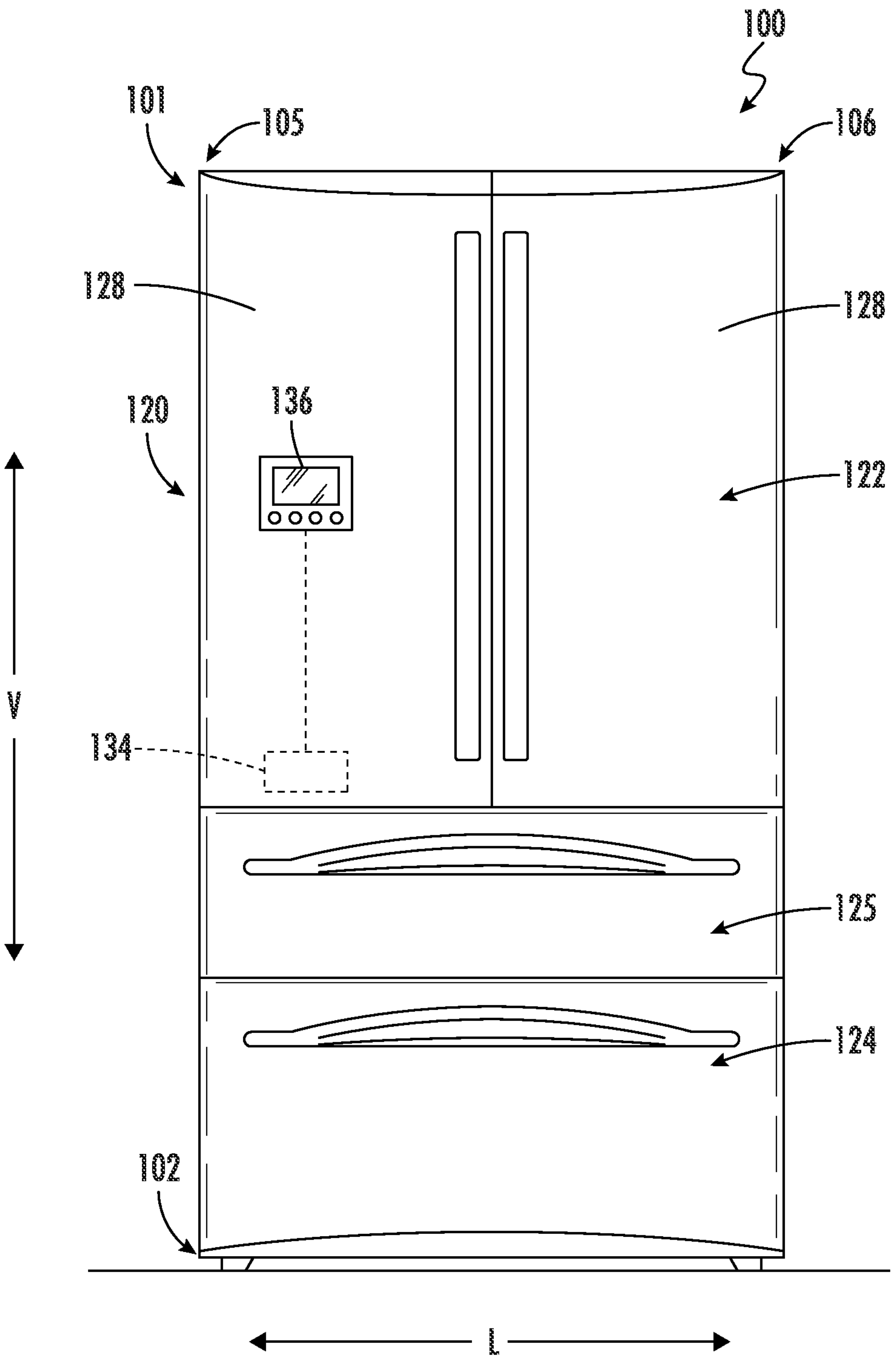
FIG. 1 provides a front view of a refrigerator appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first,” “second,” and “third” may be used interchangeably to distinguish one component from another and are not intended to signify location or importance of the individual components. The terms “includes” and “including” are intended to be inclusive in a manner similar to the term “comprising.” Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
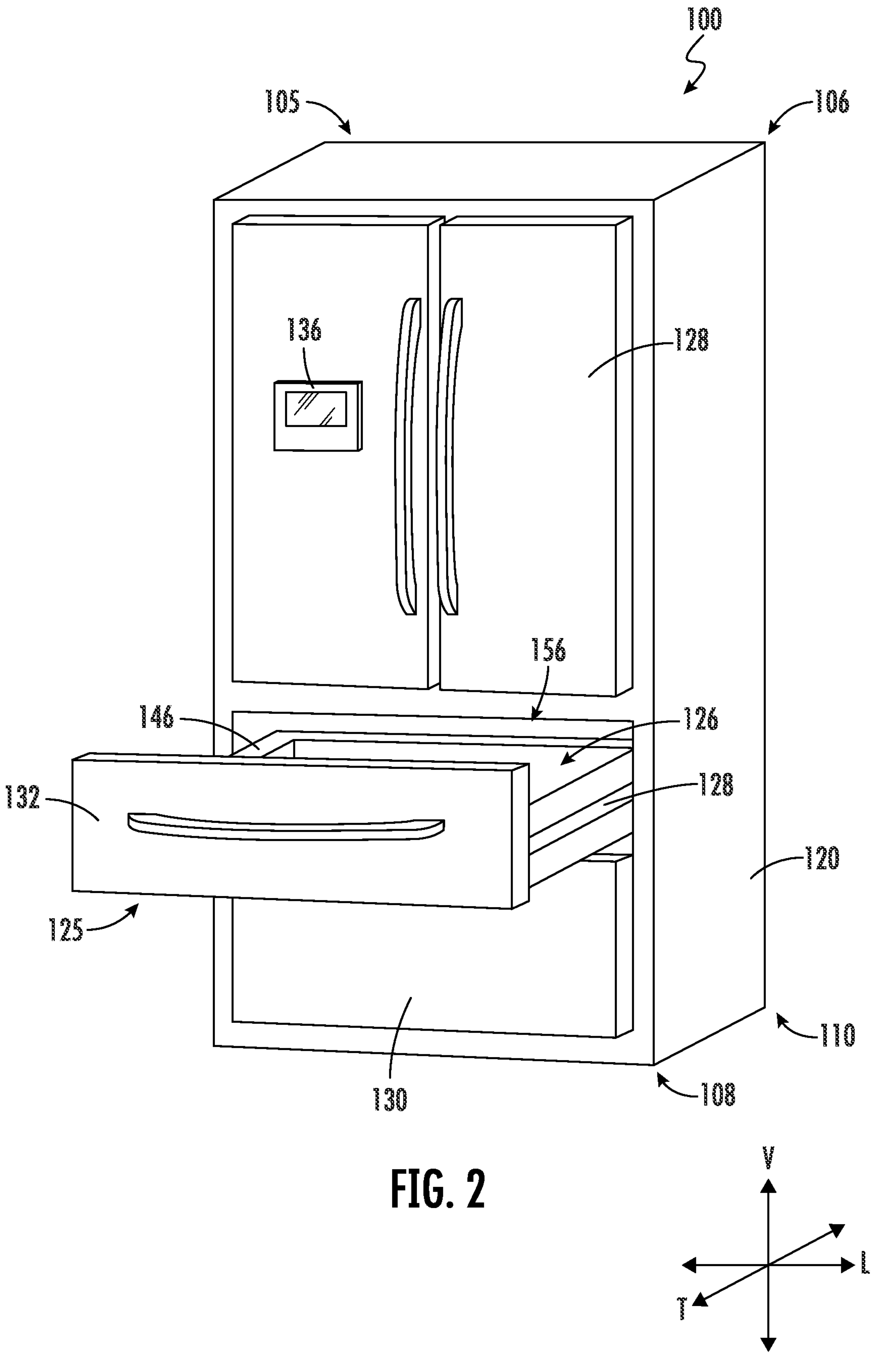
FIG. 2 provides a perspective view of the refrigerator appliance of FIG. 1 with a drawer thereof in an open position and a door of the drawer in a closed position.
Figure 3:
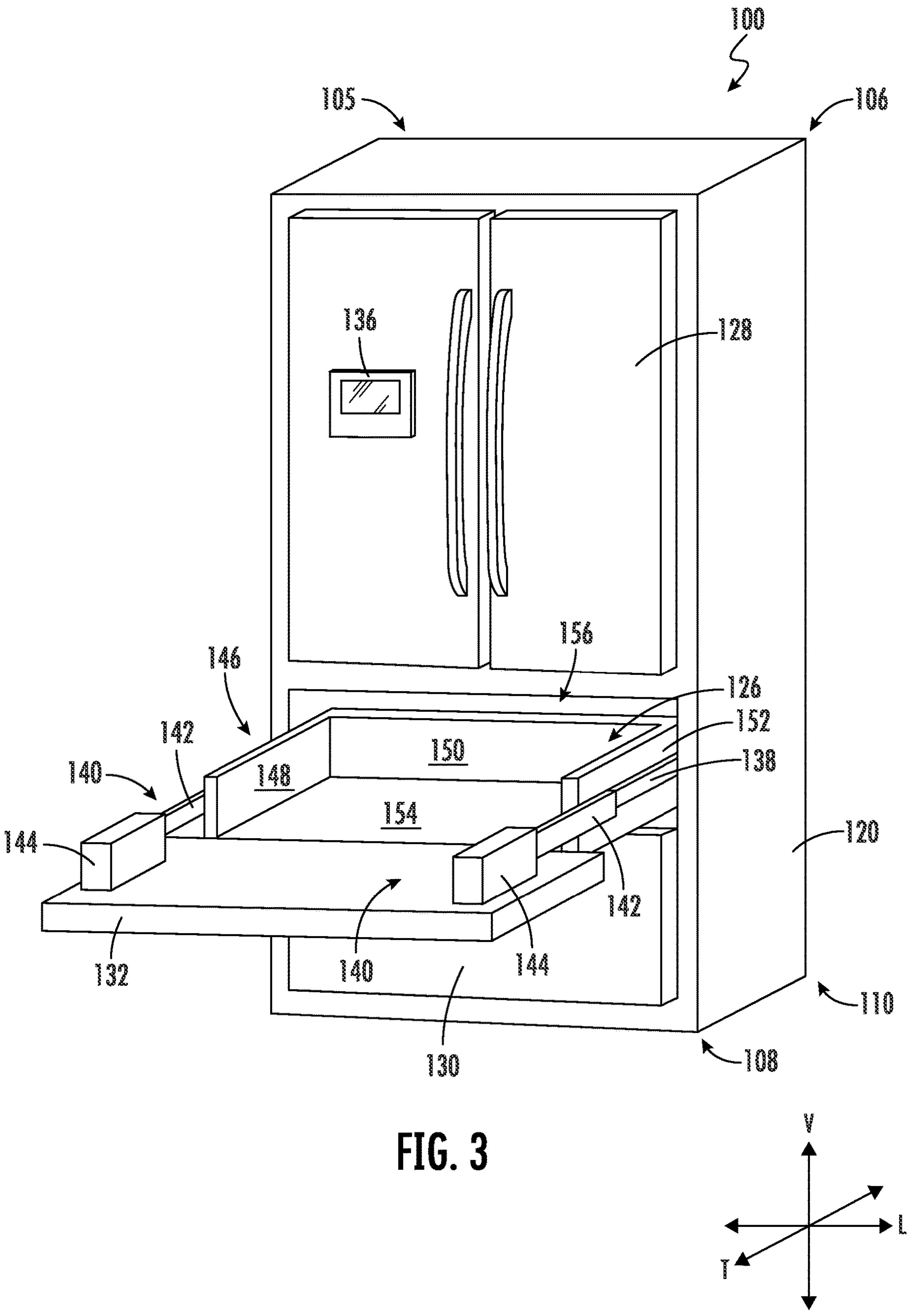
FIG. 3 provides a perspective view of the refrigerator appliance of FIG. 2 with the door of the drawer in an open position.

FIG. 1 is a front view of an exemplary embodiment of a refrigerator appliance 100. FIG. 2 is a perspective view of the refrigerator appliance 100 having a drawer 125 in an open position to reveal the interior 126 of drawer 125. FIG. 3 is a perspective view of refrigerator appliance 100 having a drawer front 132 of drawer 125 in an open position to promote access to interior 126 of drawer 125. Refrigerator appliance 100 extends between a top 101 and a bottom 102 along a vertical direction V. Refrigerator appliance 100 also extends between a left side 105 and a right side 106 along a lateral direction L. As shown in FIGS. 2 and 3, a transverse direction T may additionally be defined perpendicular to the vertical and lateral directions V, L. Refrigerator appliance 100 extends along the transverse direction T between a front portion 108 and a back portion 110.

Refrigerator appliance 100 includes a cabinet or housing 120 defining an upper fresh food chamber 122 and a lower freezer chamber or frozen food storage chamber 124 arranged below the fresh food chamber 122 along the vertical direction V. Because the frozen food storage chamber 124 is positioned below the fresh food storage chamber 122, refrigerator appliance 100 is generally referred to as a bottom mount refrigerator. Using the teachings disclosed herein, one of skill in the art will understand that the present technology can be used with other types of refrigerators (e.g., side-by-sides) or a freezer appliance as well. Consequently, the description set forth herein is for illustrative purposes only and is not intended to limit the technology in any aspect. Indeed, it should be appreciated that aspects of the drawer assembly described herein may be used in any other suitable appliance, cabinetry, or other application where a drawer is needed for selective access to a compartment.

Refrigerator doors 128 are rotatably hinged to an edge of housing 120 for accessing fresh food chamber 122. It should be noted that while two doors 128 in a "French door" configuration are illustrated, any suitable arrangement of doors utilizing one, two or more doors is within the scope and spirit of the present disclosure. A freezer door 130 is arranged below refrigerator doors 128 for accessing freezer chamber 124.

Operation of the refrigerator appliance 100 may be regulated by a controller 134 that is operatively coupled to a user interface panel 136. Panel 136 provides selections for user manipulation of the operation of refrigerator appliance 100 such as e.g., temperature selections. In response to user manipulation of the user interface panel 136, the controller 134 operates various components of the refrigerator appliance 100. The controller may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller 134 may be positioned in a variety of locations throughout refrigerator appliance 100. In the illustrated embodiment, the controller 134 may be located within one of the doors 128. In such an embodiment, input/output ("I/O") signals may be routed between the controller and various operational components of refrigerator appliance 100. In one embodiment, the user interface panel 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 134 via one or more signal lines or shared communication busses.

FIGS. 2 and 3 illustrate one example embodiment of a drawer assembly, referred to herein as a drawer 125 for the refrigerator appliance 100. The drawer 125 may be slidably mounted within the cabinet 120, e.g., with slides 138. In the illustrated example, the drawer 125 is a freezer drawer slidably mounted within the frozen food storage chamber 124 of the refrigerator appliance 100. Accordingly, the drawer 125 may assist with storing and providing access to frozen food items. For example, smaller food items such as a bag of frozen vegetables may be stored in the freezer drawer 125 to prevent or reduce such items from being obscured under or behind larger items such as a frozen turkey, etc., as compared to when only a single portion of the refrigerator appliance 100 is provided for storing frozen items. In other embodiments, the drawer 125 may be slidably mounted within the fresh food storage chamber 122 and may provide similar advantages with respect to storing and accessing fresh food items.

Figure 6:
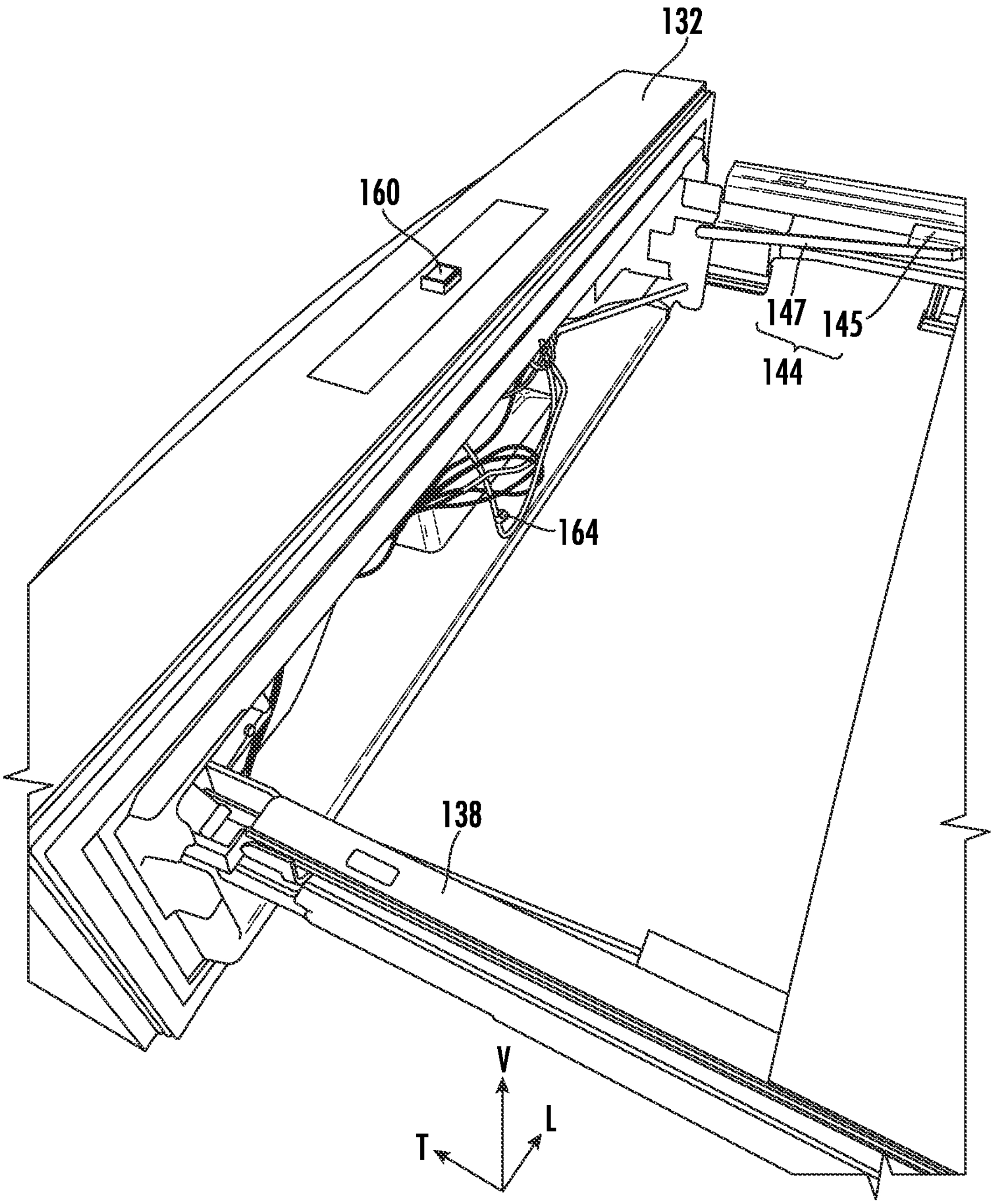
FIG. 6 provides a rear perspective view of a drawer front according to exemplary embodiments of the present disclosure.

As will be described in more detail below, the drawer 125 may have a tilt out drawer front, e.g., the drawer front 132 of the drawer 125 may be connected to a drawer body 146 with a hinge or hinge assembly 140 such that the drawer front 132 is rotatable relative to the drawer body 146. Further, the hinge assembly 140 may include a damper assembly 144 which may dampen a rotation of the drawer front 132 at least from a closed position (FIG. 2) to an open position (FIG. 3). For instance, damper assembly 144 may include a damper body 145 (FIG. 6) provided in or on at least one slide assembly 138 (described below). Damper assembly 144 may further include a damper lever 147 connected with drawer front 132. Damper lever 147 may be slidably engaged with damper body 145. Accordingly, a frictional damping force may be provided within damping body 145 as drawer front 132 moves from the closed position to the open position. It should be noted that the damper assembly 144 described herein is provided by way of example, and the disclosure is not limited to the embodiments described herein.

As best seen in FIG. 3, the drawer 125 may include a drawer body 146 which includes a left wall 148, a back wall 150, a right wall 152, and a floor 154. The drawer body 146 may be received within a drawer recess 156 defined in the cabinet 120 of refrigerator appliance 100. The drawer body 146 at least partially defines an interior 126 of the drawer 125, which may provide a storage volume, e.g., for food items. To promote accessibility of such food items which may be stored within the interior 126 of the drawer 125, the drawer front 132 of the drawer 125 may be rotatable relative to the drawer body 146, to an open position as shown in FIG. 3. The drawer front 132 may be rotatable relative to the drawer body 146 in that the drawer front 132 may be connected to the drawer body 146 by one or more hinges 140.

For example, the drawer front 132 may be connected to the drawer body 146 by a pair of hinges or hinge assemblies 140. Such hinge assemblies may include a left hinge or hinge assembly 140 connected to the left side wall 148 of the drawer body 146 by a pivot arm 142 of the left hinge 140. Additionally or alternatively, a right hinge or hinge assembly 140 may be connected to the right side wall 152 of the drawer body 146 by a pivot arm 142 of the right hinge 140. In some embodiments, the drawer 125 is slidably mounted within the cabinet 120, e.g., within the fresh food storage 122 chamber or the frozen food storage chamber 124, by a left slide assembly 138 on the left side wall 148 and a right slide assembly 138 on the right side wall 152, such that the drawer 125 can slide between an retracted position of the drawer 125 (FIG. 1) and an extended position of the drawer 125 (FIGS. 2 and 3). Additionally or alternatively, one or more gaskets may be provided on the drawer front 132 of the drawer 125 to sealingly engage the cabinet 120 when the drawer 125 is in the retracted position. Pivot arms 142 (FIG. 7) of the hinges 140 may each be connected to a corresponding slide assembly 138 at each side wall of the drawer body 146. The hinge 140, or each hinge 140 in the pair of hinges 140, may include a damper assembly 144 configured to dampen rotation of the drawer front 132 from the closed position (FIG. 2) to the open position (FIG. 3). Only one pivot arm 142 is shown in FIG. 7, however it should be understood that a second pivot arm may be included in certain embodiments.

Figure 7:
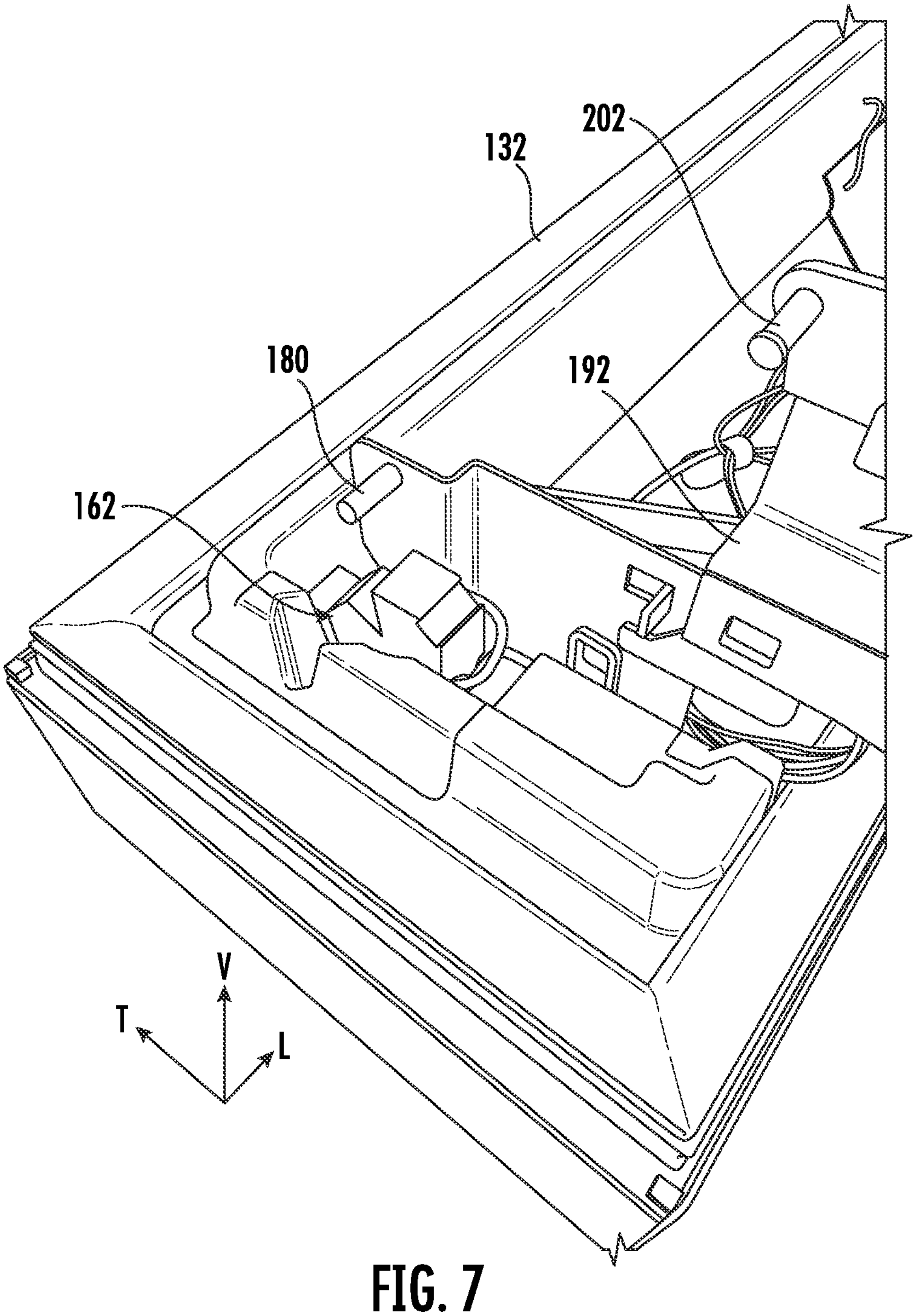
FIG. 7 provides a close-up perspective view of a latch mechanism of the exemplary drawer front of FIG. 6.

Drawer front 132 may include a slide release pin 180 (FIG. 7). Slide release pin 180 may be a cantilevered bar or pin extending from a portion of drawer front 132 (e.g., along the lateral direction L). For instance, slide release pin 180 may protrude laterally outward from an interior bracket or portion of drawer front 132 (e.g., toward a lateral side of drawer front 132). Slide release pin 180 may be positioned at or near a top of drawer front 132. For instance, slide release pin 180 may be positioned so as to interact with a catch lever (described below) provided on slide assembly 138. Accordingly, slide release pin 180 may be predominantly cylindrical having an axis defined along the lateral direction L. It should be understood that slide release pin 180 may have any suitable size and shape and the disclosure is not limited to the examples given herein.

Figure 4:
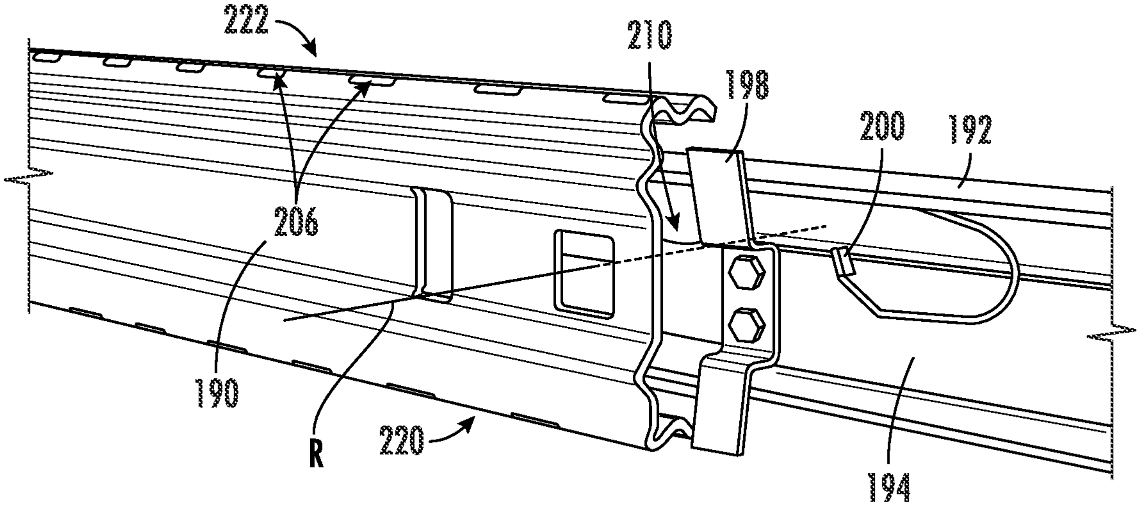
FIG. 4 provides a perspective view of a slide assembly of the drawer of FIG. 3.
Figure 5:
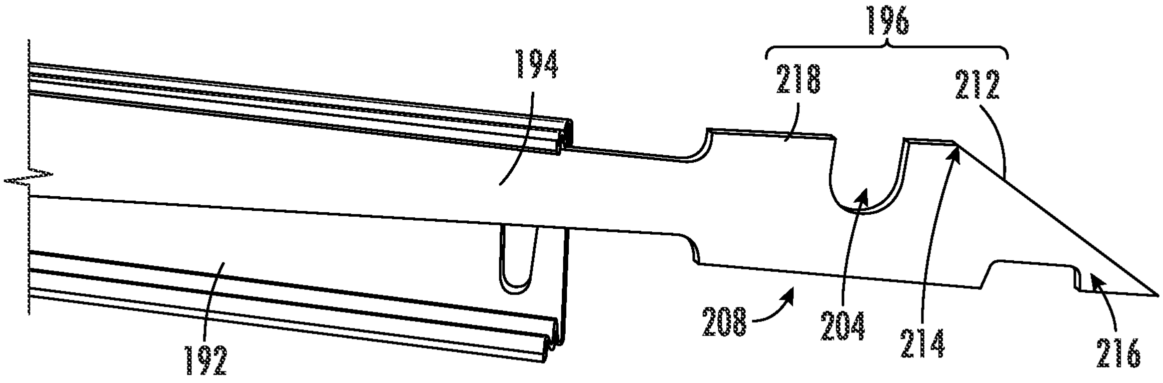
FIG. 5 provides a perspective view of the catch lever of the slide assembly of FIG. 4.

FIGS. 4 and 5 provide perspective views of slide assembly 138. Slide assembly 138 may be a multi-stage slide. For instance, slide assembly 138 may include a fixed slide 190, a sliding support 192, and a catch lever (or locking slide) 194. It should be noted that the number of stages included in slide assembly 138 is not limited and may include more or fewer stages. Fixed slide 190 may be attached to cabinet 120 of refrigerator appliance 100. For instance, fixed slide 190 may be fastened to an interior of cabinet 100 (i.e., in fresh food chamber 122 or frozen food chamber 124). Fixed slide 190 may be fastened using standard means in the art, such as fasteners, clips, adhesives, or the like. In some embodiments, a plurality of fixed slides 190 may be incorporated, wherein a discrete fixed slide 190 is attached to each lateral side of cabinet 120.

Sliding support 192 may be attached to drawer body 146. Sliding support 192 may be slidably received within fixed slide 190. In detail, sliding support 192 may slide with respect to fixed slide 190, allowing drawer 125 to be withdrawn from and inserted to cabinet 120 (e.g., between the extended and retracted positions). Similar to fixed slide 190, sliding support 192 may be fastened using standard means in the art, such as fasteners, clips, adhesives, or the like. In some embodiments, sliding support 192 is fixed to left wall 148 of drawer body 146. Additionally or alternatively, sliding support 192 may be fixed to right wall 152. Further additionally or alternatively, a plurality of sliding supports 192 may be incorporated, wherein a sliding support 192 is fixed to each of left wall 148 and right wall 152.

As described briefly above, sliding support 192 may include pivot arm 142, which allows drawer front 132 to pivot with respect to sliding support 192. As shown in FIG. 7, pivot arm 142 may attach sliding support 192 to a bottom of drawer front 132. Accordingly, a top portion of drawer front 132 may pivot outward (e.g., along the transverse direction T) and downward (e.g., along the vertical direction V) about an axis formed laterally through pivot arm 142. However, the location of the connection between pivot arm 142 and drawer front 132 is not limited.

Sliding support 192 may include a catch bar 202. Catch bar 202 may be a cantilevered bar or pin extending from a distal front edge of sliding support 192 (e.g., along the lateral direction L). For instance, catch bar 202 may protrude laterally outward from sliding support 192 (e.g., toward a lateral side of drawer assembly 125). Catch bar 202 may be positioned at or near a top of sliding support 192. For instance, catch bar 202 may be positioned so as to interact with a latch (described below) provided on drawer front 132. Accordingly, catch bar 202 may be predominantly cylindrical having an axis defined along the lateral direction L. It should be understood that catch bar 202 may have any suitable size and shape and the disclosure is not limited to the examples given herein.

Catch lever 194 may be connected to sliding support 192. For example, catch lever 194 is rotatably connected to sliding support 192. During use, catch lever 194 may rotate about a rotational axis R defined along a horizontal axis (e.g., an axis defined in the lateral direction) with respect to sliding support 192. Catch lever 194 may define a first end 208 and a second end 210 opposite first end 208. The rotational axis R may be located a predetermined distance away from second end 210 (i.e., toward a center of catch lever 194). Accordingly, each of first end 208 and second end 210 of catch lever 194 may be movable in the vertical direction V as catch lever 194 rotates about the rotational axis R.

First end 208 of catch lever 208 may be located adjacent drawer front 132. First end 208 may contact slide release pin 180 when drawer front 132 is in the closed position. A first portion 212 of a top edge 196 of first end 208 of catch lever 194 may be angled such that a first point 214 of top edge 196 proximate drawer front 132 is lower than a second point 216 of top edge 196 in the vertical direction V. Accordingly, when slide release pin 180 is moved in the transverse direction T (i.e., toward the drawer interior 126), slide release pin 180 may push top edge 196 of first end 208 of catch lever 194 in the vertical direction V (e.g., downward). Consequently, second end 210 of catch lever 194 may be moved in the vertical direction V (e.g., upward).

Second end 210 of catch lever 194 may be provided distal the drawer front 132. A locking tab 198 may extend from the catch lever 194 proximate the second end 210. Locking tab 198 may extend substantially in the vertical direction V. In some embodiments, two locking tabs 198 are provided, each extending in the vertical direction V opposite each other (e.g., one upward, one downward).

Fixed slide 190 may include a plurality of notches 206 formed therein. Notches 206 may be formed through a bottom edge 220 of fixed slide 190. Additionally or alternatively, notches may be formed through a top edge 222 of fixed slide 190. Notches 206 may be formed to accept locking tab 198 therein (e.g., as complementary members). For example, when drawer front 132 is in the open position (e.g., slide release pin 180 is not in contact with catch lever 194), locking tab 198 is inserted into one of the plurality of notches 206. As a result, catch lever 194 and sliding support 192 are fixed with respect to fixed slide 190 and, consequently, drawer body 146. In some embodiments, catch lever 194 can be extended such that locking tab 198 is removed from fixed slide 190 (i.e., locking tab 198 is positioned in front of fixed slide 190 in the transverse direction T). In this case, locking tab 198 may engage a front surface of fixed slide 190, thus locking catch lever 194 with respect to locking slide 190 and preventing drawer front 132 from being pushed to a closed position.

Slide assembly 138 may further include a catch lever spring 200. Catch lever spring 200 may be a resilient member positioned between catch lever 194 and sliding support 192. Catch lever spring 200 may bias second end 210 of catch lever 194 in the vertical direction V (e.g., downward). Catch lever spring 200 may be any sufficient resilient member, such as a coil spring, a leaf spring, a torsion spring, or the like. When drawer front 132 is in the open position, catch lever spring 200 may bias second end 210 downward in the vertical direction V such that locking tab 198 is inserted into one of the plurality of notches 206. This may be referred to as a locked position, or an engaged position. When drawer front 132 is in the closed position, catch lever 194 may be in the disengaged position. In other words, no locking tab 198 is received in any of the plurality of notches 206. This may also be referred to as a central position of catch lever 194. Accordingly, catch lever 194 and sliding support 192 are free to slide with respect to fixed slide 190. Therefore, advantageously, sliding support 192, catch lever 194, and, consequently, drawer 125, may only be withdrawn from and inserted to cabinet 120 when drawer front 132 is in the closed position and catch lever 194 is in the disengaged position. This prevents damage from occurring to drawer front 132 or freezer door 130 when attempting to insert drawer 125 into cabinet 120 when drawer front 132 is in the open position.

Drawer front 132 may be moved between the closed position and the open position electronically. In detail, with specific reference to FIGS. 6 and 7, drawer front 132 may include a latch (described below) configured to electronically disengage from, for example, catch bar 202. An electronic input 160 may be provided on drawer front 132. Electronic input 160 may be any suitable interactive member capable of receiving an input. For instance, electronic input may be a push button, a touch button, a switch, a toggle, a knob, or the like. Thus, a user may press electronic input 160 to initiate a movement of drawer front 132 from the closed position to the open position.

A latch 162 may be attached to drawer front 132. In detail, latch 162 may be configured to operably disengage with catch bar 202 in response to an input signal from electronic input 160. Latch 162 may be an electronic latch. For instance, latch 162 may include a solenoid latch mechanism including a motor and a driven device (e.g., a locking cylinder). Accordingly, when a user activates electronic input 160, the input signal may be transmitted to latch 162 to release catch bar 202 attached to slide assembly 138. Latch 162 may selectively rotate (e.g., about an axis defined along the lateral direction L) upon receiving the input signal. Thus, drawer front 132 may begin rotating from the closed position to the open position under its own weight. As described above, one or more damper assemblies 144 may provide a frictional damping force to soften an opening motion of drawer front 132.

Drawer assembly 125 may include a control board 164 provided in drawer front 132. Control board 164 may be operably coupled with electronic input 160 and latch 162. For instance, electronic input 160 and latch 162 may be connected to control board 164 via one or more wires. Accordingly, the input signal from electronic input 160 may be transmitted through control board 164 before reaching latch 162. Control board 164 may be a printed circuit board (PCB) including one or more electric connectors. Thus, input/output ("I/O") signals may be routed between control board 164 and various operational components, such as electronic input 160, latch 162, and the like.

Figure 8:
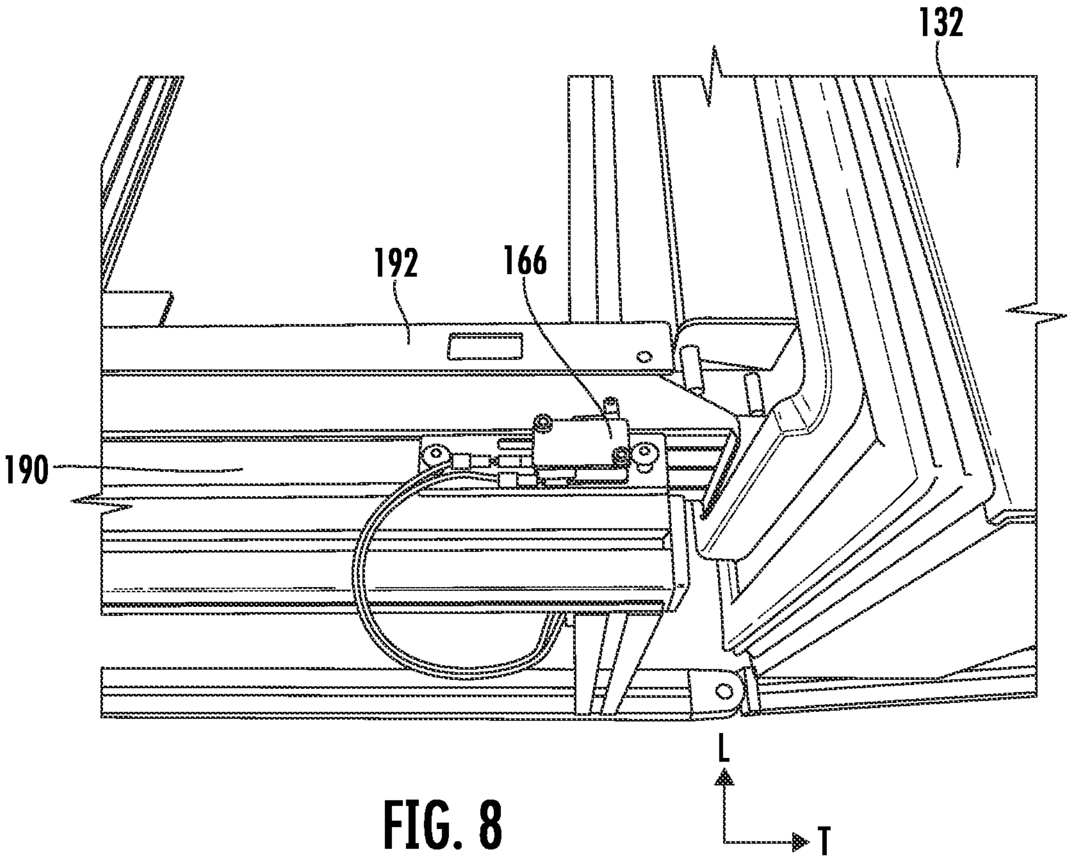
FIG. 8 provides a top view of the slide assembly of FIG. 4 showing a switch.

Drawer assembly 125 may include a switch 166. Switch 166 may be provided on fixed slide 190. Switch 166 may be any suitable switch, such as a contact switch, a proximity switch, an optical switch, a reed switch, or the like. According to at least one embodiment, switch 166 is a contact switch configured to receive a physical activation input and transmit a signal in response to receiving the physical activation input. Accordingly, switch 166 may be manipulated between an activated state (FIG. 9) and a deactivated state (FIG. 8). Switch 166 may be operably connected with control board 164. For instance, one or more wires may connect switch 166 with control board 164. However, switch 166 may be wirelessly connected with control board 164 according to some embodiments. Switch 166 may be provided within drawer recess 156 (e.g., within cabinet 120).

Drawer assembly 125 may include an actuator 168. Actuator 168 may be provided on sliding support 192. Actuator may be a solid piece capable of physically contacting and activating switch 166. For instance, actuator 168 may be a predominantly rectangular shaped piece attached to sliding support 192 so as to move together with sliding support 192 when drawer body 146 is moved between the retracted position and the extended position. Actuator 168 may define an activation surface 170 and a contact surface 172.

Figure 9:
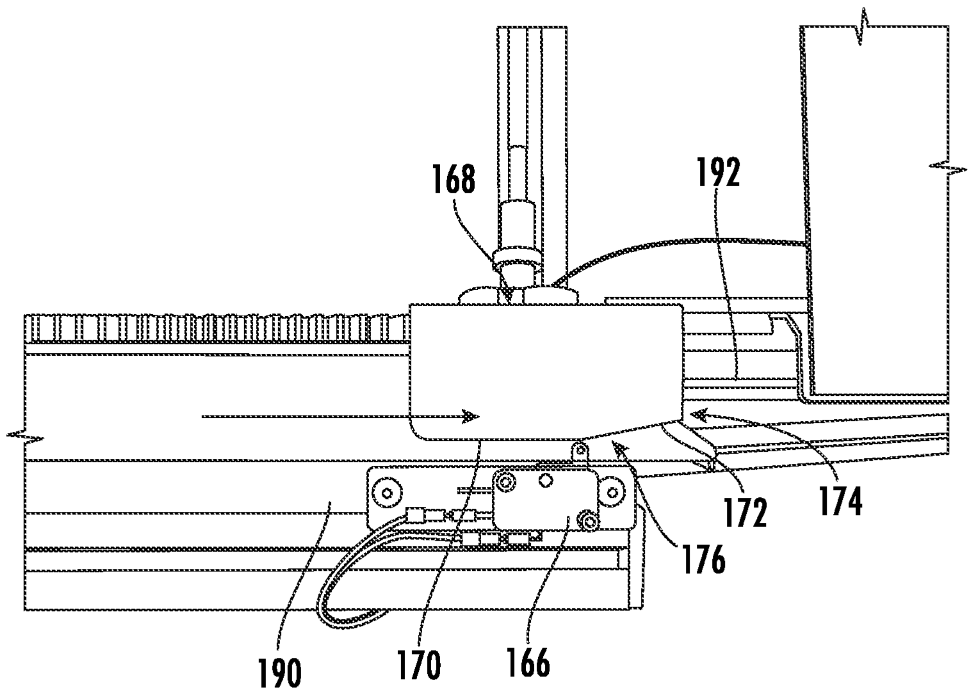
FIG. 9 provides a top view of the slide assembly of FIG. 4 in an extended position showing an actuator in contact with the switch of FIG. 8.

As seen primarily in FIG. 9, contact surface 172 is oriented parallel with a slide direction of sliding support 192 (e.g., along the transverse direction T). Activation surface 170 may extend from a distal end of contact surface 172 at a predetermined angle. For instance, an extension direction of activation surface 170 may form an acute angle with the transverse direction T (e.g., with an extension direction of contact surface 172). Thus, activation surface 170 may be referred to as an inclined surface, with a degree of inclination defined along the lateral direction L. A front edge 174 (e.g., toward a front of drawer assembly 125) of activation surface 170 may be disposed inward (e.g., toward drawer interior 126 along the lateral direction L) while a trailing edge 176 of activation surface 170 is disposed laterally outward from front edge 174. Thus, trailing edge 176 of activation surface 170 may connect activation surface 170 with contact surface 172.

Activation surface 170 may contact switch 166 as drawer body 146 is pulled outward to the extended position. For instance, switch 166 may be provided toward a front of fixed slide 190 (e.g., toward a front of cabinet 120) and actuator 168 may be provided toward a rear of sliding support 192 (e.g., along the transverse direction T). Thus, actuator 168 may not contact switch 166 until drawer body 146 is fully or nearly fully extended from drawer recess 156. In detail, as drawer body 146 reaches full extension, activation surface 170 begins to press switch 166 (e.g., as a result of being inclined along the lateral direction L). Upon reaching full extension, contact surface 172 ensures that switch 166 is maintained in a fully activated state.

As mentioned above, switch 166 may be electrically connected with control board 164. In detail, switch 166 may complete a circuit between electronic input 160 and latch 162. When switch 166 is in the deactivated state (e.g., not pressed by contact surface 172), a complete circuit may not be formed between electronic input 160 and latch 162. Accordingly, if a user supplies an input to electronic input 160, no input signal will be sent to latch 162 to detach drawer front 132 from slide assembly 138. Advantageously, switch 166 prevents damage from occurring to drawer front 132 by accidentally lowering drawer front 132 when drawer assembly 125 is not fully extended (e.g., to the open position).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drawer assembly for an appliance, the appliance comprising a cabinet defining a drawer recess, the drawer assembly comprising:

a drawer front for providing selective access to the drawer recess, the drawer front being rotatable between an open position and a closed position;

a slide operably coupling the drawer front to the cabinet, the slide comprising:

a catch bar;

a fixed slide mounted to the appliance, the fixed slide defining a receiving slot; and a sliding support slidably engaged with the fixed slide, the sliding support being coupled to the drawer front and moving the drawer front between a retracted position and an extended position an electronic input provided on the drawer front, the electronic input configured to transmit an input signal; and a latch provided in the drawer front, the latch being operably coupled with the electronic input and selectively engaged with the catch bar based on the input signal;

a switch provided on the fixed slide, the switch being operably coupled to the control board; and an actuator provided on the sliding support, the actuator configured to activate the switch from a deactivated state to an activated state in response to the drawer front being in the extended position.

2. The drawer assembly of claim 1, further comprising:

a control board operably coupled with the electronic input and the latch.

3. The drawer assembly of claim 1, wherein the electronic input is electrically connected to the latch in response to the switch being activated.

4. The drawer assembly of claim 1, further comprising:

a catch lever operably coupled to the fixed slide and the sliding support, the catch lever being movable between an engaged position where the sliding support is fixed relative to the fixed slide and a disengaged position where the sliding support is slidable relative to the fixed slide.

5. The drawer assembly of claim 4, wherein the drawer front comprises:

a slide release pin, the slide release pin selectively contacting the catch lever to move the catch lever from the engaged position to the disengaged position when the drawer front is moved to the closed position.

6. The drawer assembly of claim 1, wherein the electronic input is a button provided on a top of the drawer front when the drawer front is in the closed position.

7. The drawer assembly of claim 1, wherein the latch is a solenoid latch rotatable between a latched position and an unlatched position.

8. The drawer assembly of claim 1, further comprising:

a damper connected to the drawer front and the slide, the damper comprising:

a damper body provided within the slide; and a damper lever connected with the drawer front and slidably engaged with the damper body, the damper providing a damping resistance to a rotational movement of the drawer front from the closed position to the open position.

9. A refrigerator appliance, comprising:

a cabinet defining a fresh food storage chamber and a frozen food storage chamber; and a drawer slidably mounted within one of the fresh food storage chamber and the frozen food storage chamber and defining a drawer recess, wherein the drawer comprises:

a drawer front for providing selective access to the drawer recess, the drawer front being rotatable between an open position and a closed position;

a slide operably coupling the drawer front to the cabinet, the slide comprising:

a catch bar;

a fixed slide mounted to the appliance, the fixed slide defining a receiving slot; and a sliding support slidably engaged with the fixed slide, the sliding support being coupled to the drawer front and moving the drawer front between a retracted position and an extended position an electronic input provided on the drawer front, the electronic input configured to transmit an input signal; and a latch provided in the drawer front, the latch being operably coupled with the electronic input and selectively engaged with the catch bar based on the input signal;

a switch provided on the fixed slide, the switch being operably coupled to the control board; and an actuator provided on the sliding support, the actuator configured to activate the switch from a deactivated state to an activated state in response to the drawer front being in the extended position.

10. The refrigerator appliance of claim 9, further comprising:

a control board operably coupled with the electronic input and the latch.

11. The refrigerator appliance of claim 9, wherein the electronic input is electrically connected to the latch in response to the switch being activated.

12. The refrigerator appliance of claim 9, further comprising:

a catch lever operably coupled to the fixed slide and the sliding support, the catch lever being movable between an engaged position where the sliding support is fixed relative to the fixed slide and a disengaged position where the sliding support is slidable relative to the fixed slide.

13. The refrigerator appliance of claim 12, wherein the drawer front comprises:

a slide release pin, the slide release pin selectively contacting the catch lever to move the catch lever from the engaged position to the disengaged position when the drawer front is moved to the closed position.

14. The refrigerator appliance of claim 9, wherein the electronic input is a button provided on a top of the drawer front when the drawer front is in the closed position.

15. The refrigerator appliance of claim 9, wherein the latch is a solenoid latch rotatable between a latched position and an unlatched position.

16. The refrigerator appliance of claim 9, further comprising:

a damper connected to the drawer front and the slide, the damper comprising:

a damper body provided within the slide; and a damper lever connected with the drawer front and slidably engaged with the damper body, the damper providing a damping resistance to a rotational movement of the drawer front from the closed position to the open position.

* * * * *